US012671599B1

(12) United States Patent
Vasiliu-Feltes et al.

(10) Patent No.: US 12,671,599 B1
(45) Date of Patent: Jun. 30, 2026

(54) SYSTEMS AND METHODS FOR A MULTI-SYSTEM, MULTI-CLIENT, MULTIDIRECTIONAL, CYBER-RESILIENT, PERMISSIONED BLOCKCHAIN IMAGING DATA EXCHANGE PLATFORM

(71) Applicant: SOFTHREAD, INC., Severna Park, MD (US)

(72) Inventors: Ingrid Vasiliu-Feltes, Miami, FL (US); Stephen Dennis, Columbia, MD (US); Eliot Siegel, Orlando, FL (US)

(73) Assignee: SOFTHREAD, INC., Severna Park, MD (US)

( * ) Notice: Subject to any disclaimer, the term of this patent is extended or adjusted under 35 U.S.C. 154(b) by 186 days.

(21) Appl. No.: 18/108,203

(22) Filed: Feb. 10, 2023

Related U.S. Application Data

(60) Provisional application No. 63/309,419, filed on Feb. 11, 2022.

(51) Int. Cl.
*H04L 9/00* (2022.01)
*H04L 9/32* (2006.01)

(52) U.S. Cl.
CPC .............. *H04L 9/50* (2022.05); *H04L 9/3239* (2013.01); *H04L 9/3247* (2013.01)

(58) Field of Classification Search
CPC ........ H04L 9/3239; H04L 9/3247; H04L 9/50
USPC ......................................................... 713/176
See application file for complete search history.

(56) References Cited

U.S. PATENT DOCUMENTS

| | | | | |
|---|---|---|---|---|
| 9,785,229 B1 * | 10/2017 | Shankar | ............... | G11B 27/322 |
| 11,769,577 B1 * | 9/2023 | Dods | ...................... | G16H 20/10 |
| | | | | 705/50 |
| 2013/0198840 A1 * | 8/2013 | Drissi | ................... | G06F 21/552 |
| | | | | 726/22 |

(Continued)

FOREIGN PATENT DOCUMENTS

CN          112840617 A  *  5/2021  ............... H04L 9/50

OTHER PUBLICATIONS

CN-112840617-A English machine-translation using Clarivate Analytics, pp. 1-20 (Year: 2019).*

(Continued)

*Primary Examiner* — David P Zarka
(74) *Attorney, Agent, or Firm* — Kutak Rock LLP

(57) ABSTRACT

Techniques are described herein for enhancing the privacy, confidentiality, cyber-resilience, and operational efficiency of multi-system, multi-client, multi-directional image exchanges among client users, devices, servers, cloud environments, or other applications within one network or a system of networks by deploying a permissioned blockchain, that uses threshold cryptographic primitives and the key component of permissioned blockchains called Byzantine fault-tolerant (BFT) protocol, combined with fine-grained access control, publish/subscribe capabilities and a novel use of the private chaincode functionality during image exchange operations, which involves image sharing without sacrificing performance. Techniques, methods, processes, and systems described herein can enhance operational efficiency by increasing operational processing speed and reducing operational processing time for image exchange operations within the platform.

2 Claims, 8 Drawing Sheets

ILLUSTRATION OF A PERMISSIONED BLOCKCHAIN NETWORK WITHIN THE PROPOSED SYSTEM

(56)         References Cited

U.S. PATENT DOCUMENTS

| | | | | |
|---|---|---|---|---|
| 2017/0287090 | A1* | 10/2017 | Hunn | H04L 63/12 |
| 2017/0373858 | A1* | 12/2017 | Mandal | H04L 63/0428 |
| 2018/0005186 | A1* | 1/2018 | Hunn | G06F 16/219 |
| 2021/0144517 | A1* | 5/2021 | Guim Bernat | H04L 9/3247 |
| 2021/0200785 | A1* | 7/2021 | Poteet, III | G06F 16/27 |
| 2021/0328770 | A1* | 10/2021 | Gaur | H04L 9/0637 |
| 2021/0342291 | A1* | 11/2021 | Garg | H04L 9/50 |
| 2021/0349854 | A1* | 11/2021 | Sun | H04L 9/3247 |
| 2023/0153397 | A1* | 5/2023 | Xu | G06Q 20/0655 |
| | | | | 726/26 |
| 2024/0330948 | A1* | 10/2024 | Saklampanakis | G06Q 30/018 |

OTHER PUBLICATIONS

McBee, et al., "Blockchain Technology: Principles and Applications in Medical Imaging", Journal of Imaging Informatics in Medicine, Issue 3 (2020).

Zhao, et al., "A Secure Storage Strategy for Blockchain Based on MCMC Algorithm", IEEE Access, vol. 8 (2020).

* cited by examiner

FIGURE 1. ILLUSTRATION OF THE PROPOSED INVENTION
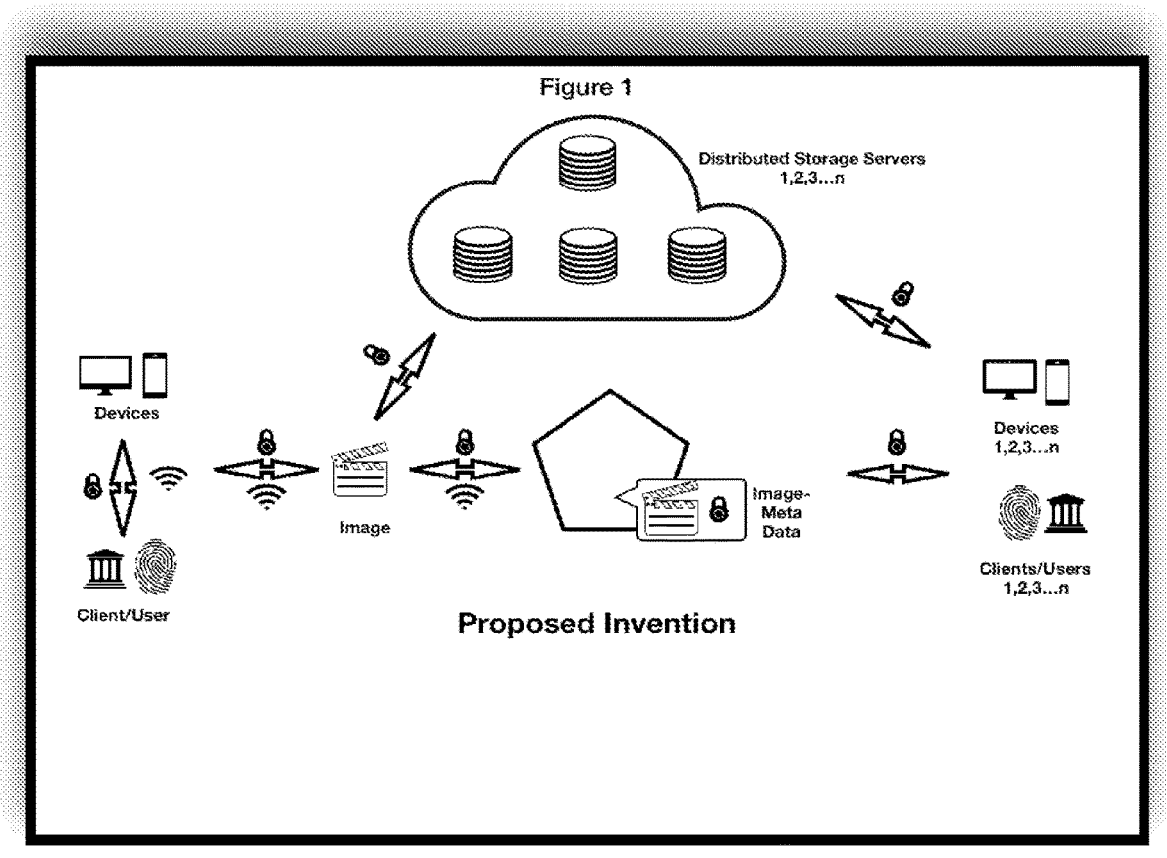

FIGURE 2. ILUSTRATION OF A PERMISSIONED BLOCKCHAIN NETWORK WITHIN THE PROPOSED SYSTEM
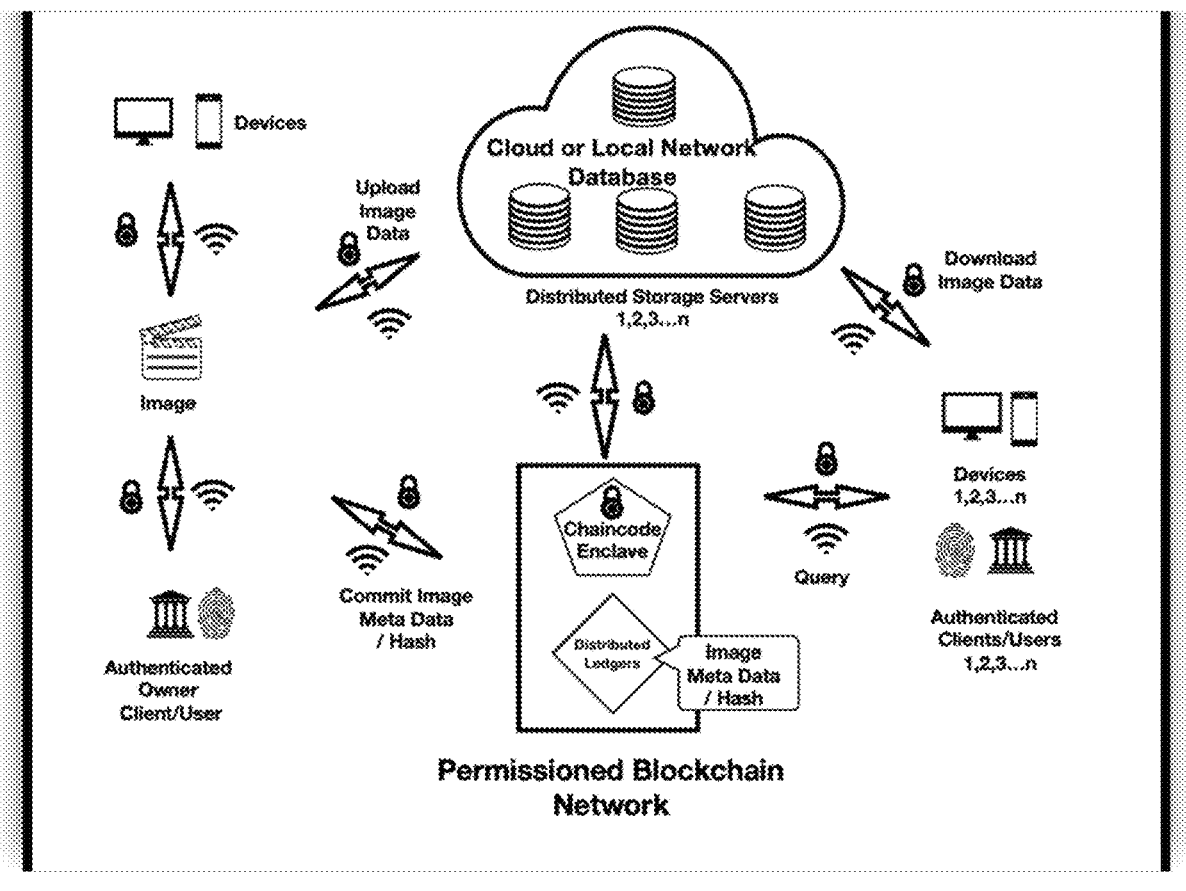

FIGURE 3. ILLUSTRATION OF KEY COMPONENTS FOR PROPOSED
SYSTEM FOR AN INDUSTRY AGNOSTIC WORKLOW
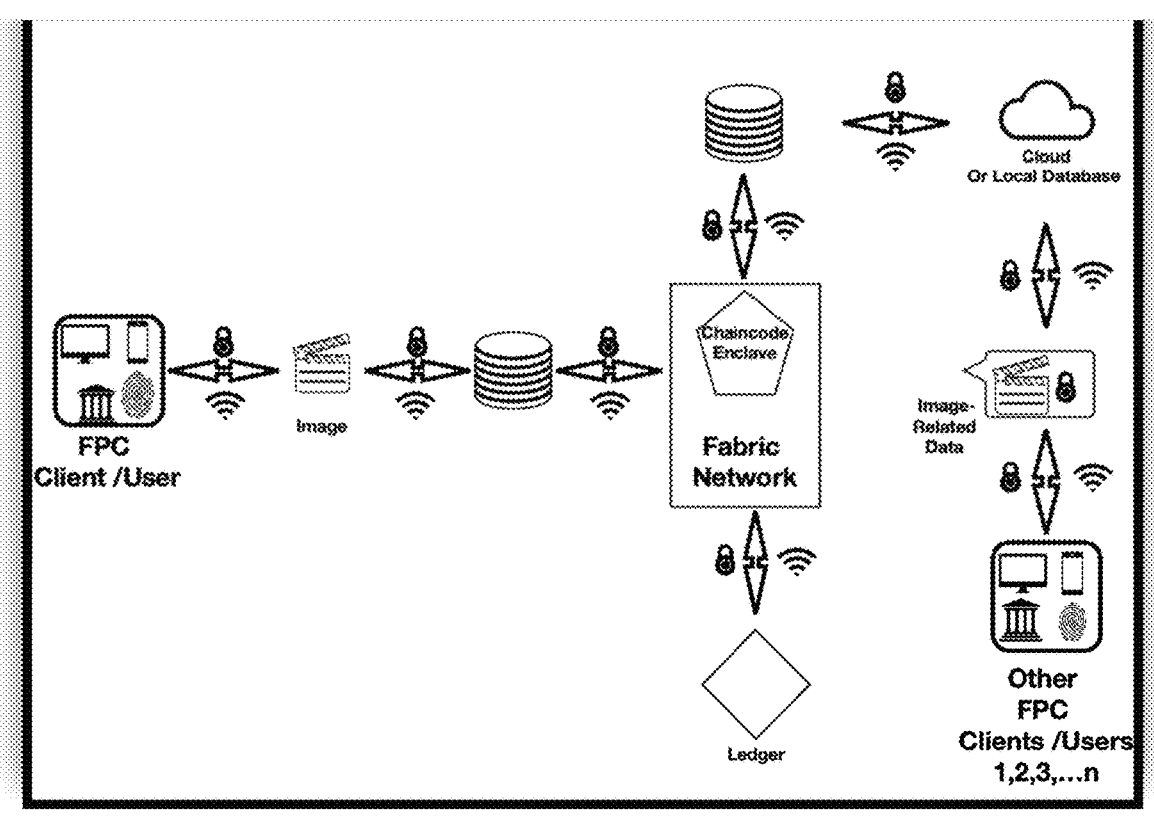

FIGURE 4. MEDICAL IMAGING RADIOLOGY INDUSTRY WORKFLOW EXAMPLE.
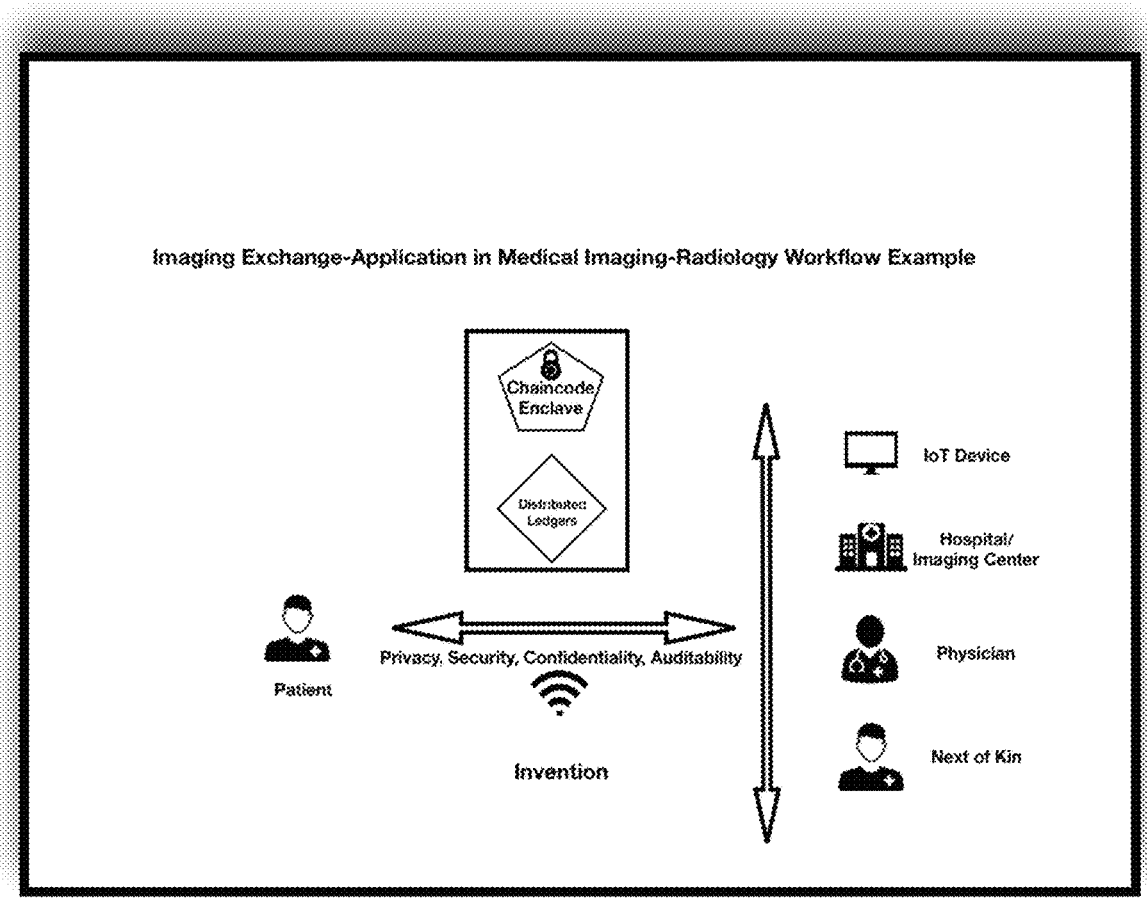

FIGURE 5. SATELLITE IMAGING EXCHANGE WORKFLOW EXAMPLE
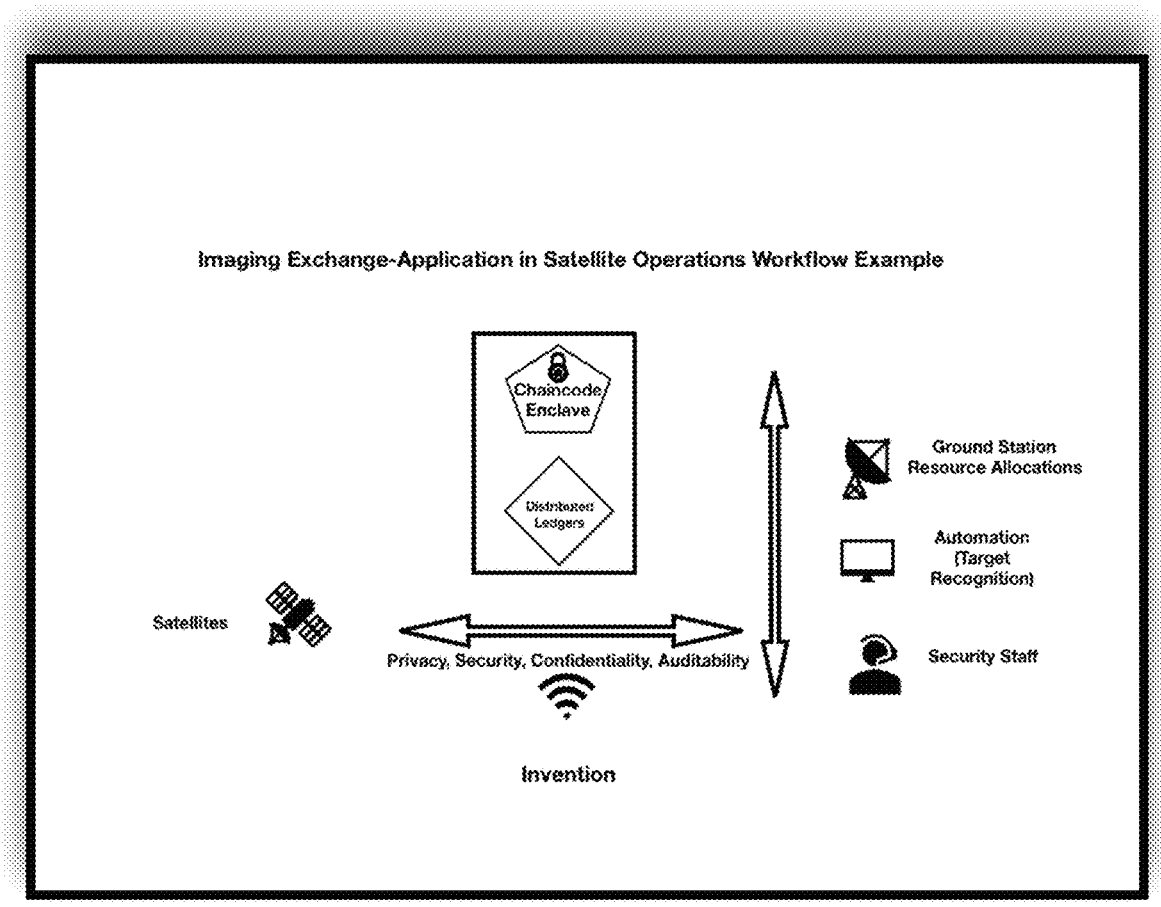

FIGURE 6. FINANCIAL INDUSTRY EXAMPLE
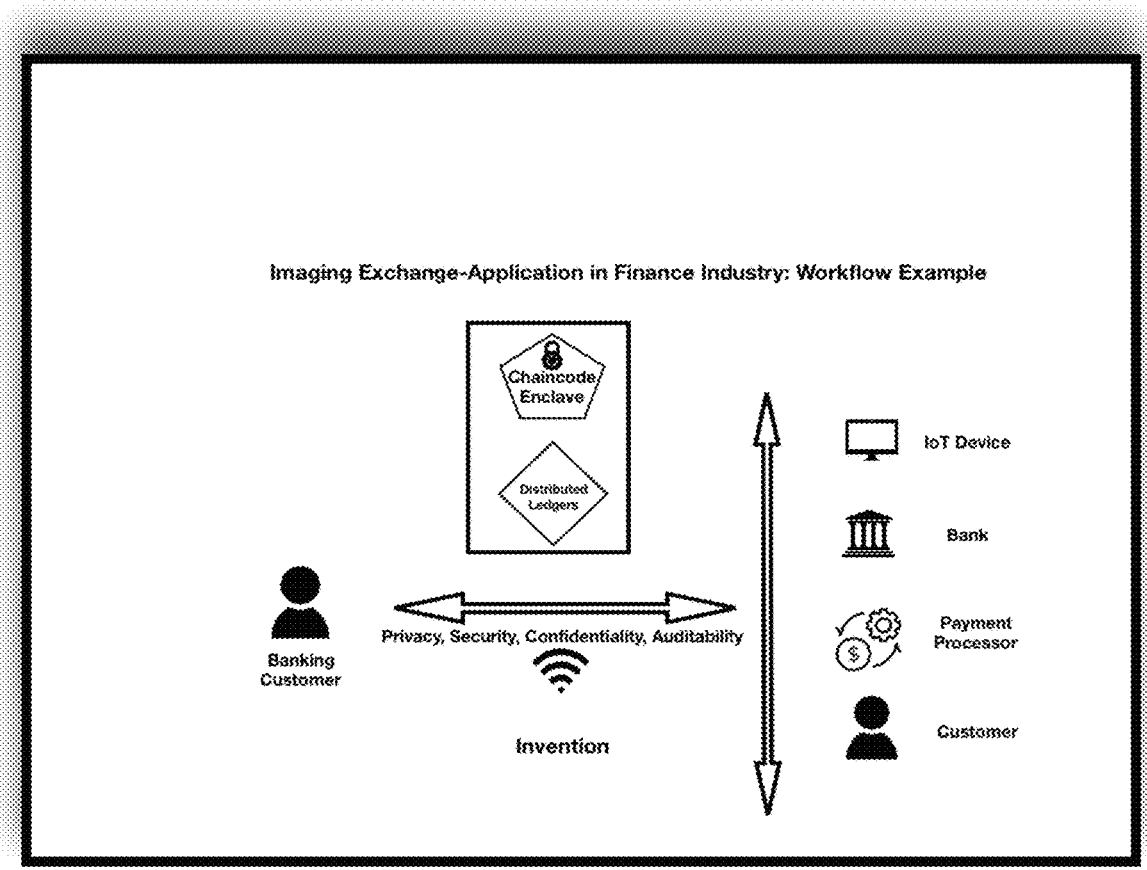

FIGURE 7. DEFENSE AND SECURITY INDUSTRY EXAMPLE
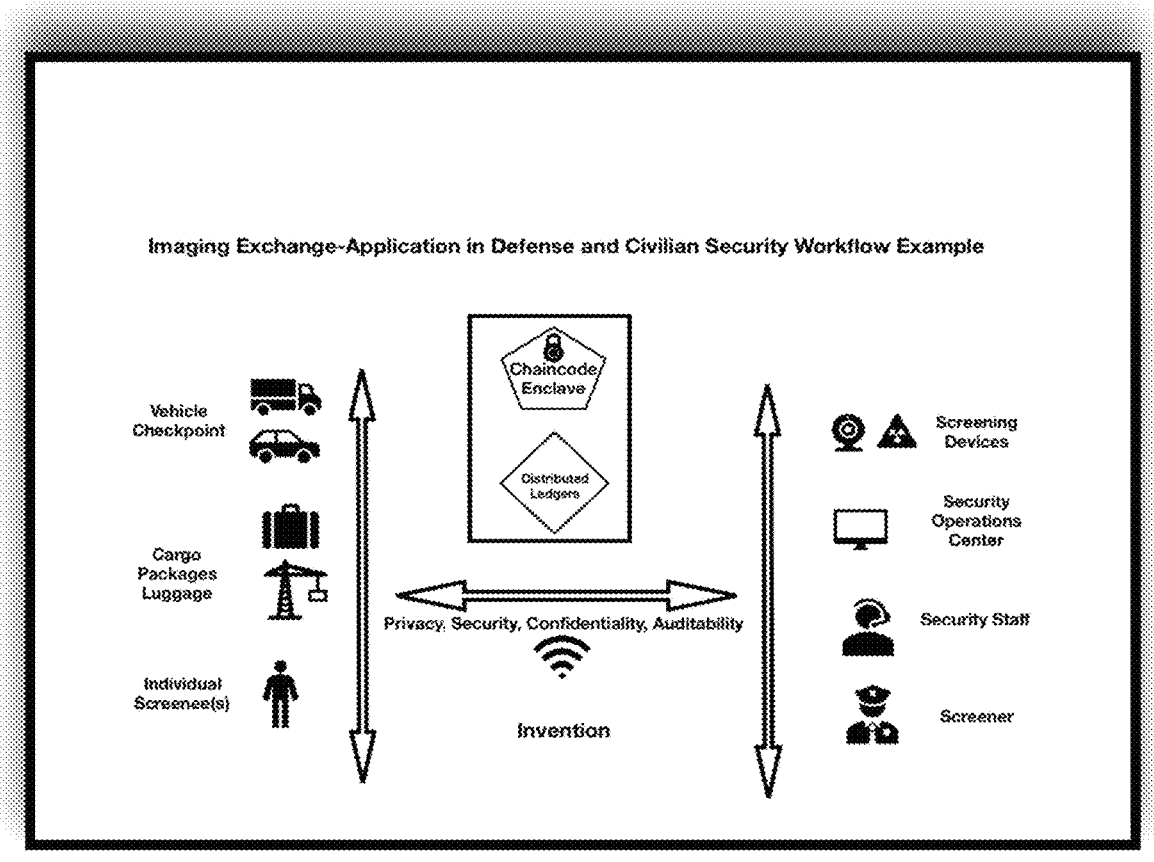

FIGURE 8. ENERGY IMAGE EXCHANGE EXAMPLE
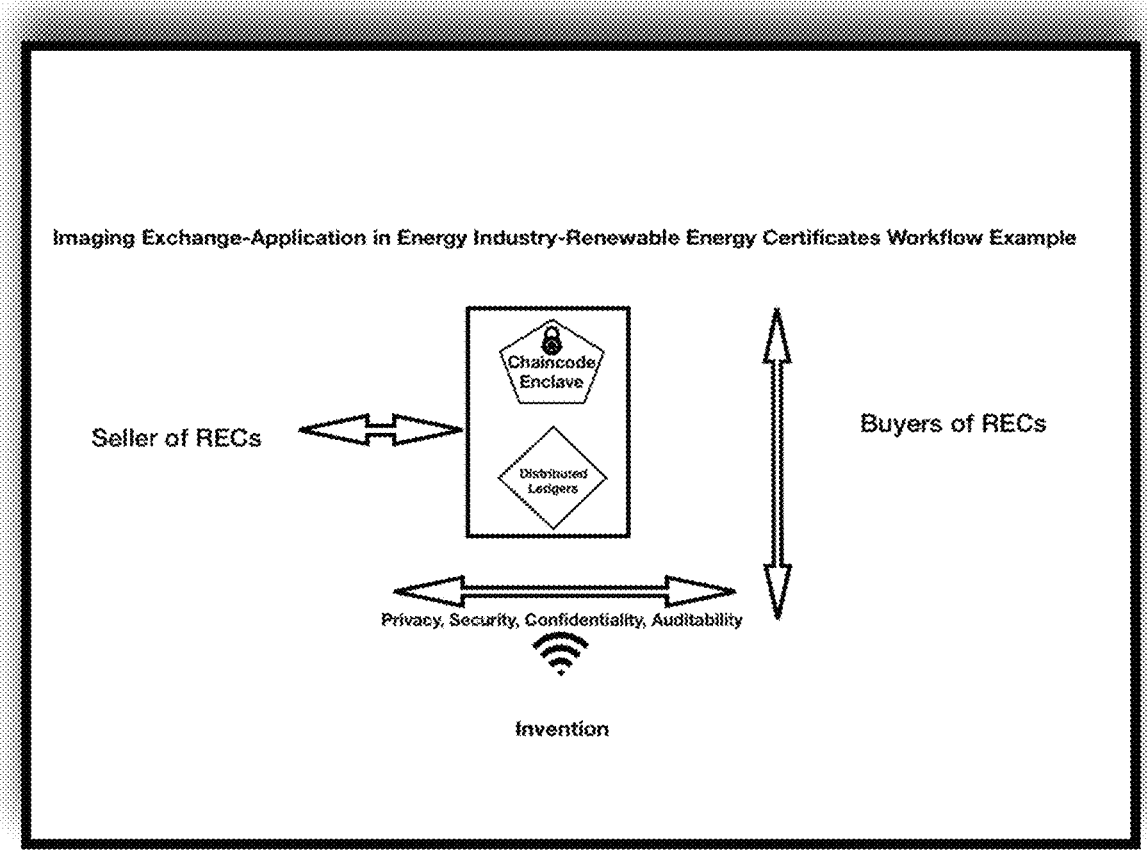

SYSTEMS AND METHODS FOR A MULTI-SYSTEM, MULTI-CLIENT, MULTIDIRECTIONAL, CYBER-RESILIENT, PERMISSIONED BLOCKCHAIN IMAGING DATA EXCHANGE PLATFORM

CROSS-REFERENCE TO RELATED APPLICATIONS

This application claims priority to U.S. Provisional Patent Application Ser. No. 63/309,419, filed Feb. 11, 2022, the entire disclosure of which is incorporated herein by reference.

FIELD OF THE INVENTION

The present invention disclosure relates generally to systems and methods for image data exchanges that may occur among systems of networks, one or more individual networks, servers, devices, cloud-enabled technology applications, and/or other embedded computing services. More specifically, the present invention is concerned with systems and methods for a multi-system, multi-client, multi-directional, cyber-resilient, permissioned blockchain infrastructure with decentralized, attribute-based, fine-grained access control, and confidentiality preserving imaging data exchange capabilities.

BACKGROUND

By 2022, it is expected that 70% of the global GDP will have undergone digitization and by 2025 more than 200 petabytes of data will be stored in a cloud environment. Since January 2021 more than 3 billion data breaches have been reported and 50% of the cyberattacks are targeting networks and supply chains. Global costs related to cybercrime are estimated to reach $10.5 trillion annually with an average cost per breach of $4.2 million. The organizational burden to identify and resolve each breach is also significant, as it takes, on average, 212 days to identify a breach and 75 days to resolve one. Cybersecurity remains a major global threat across all industries, with healthcare, life sciences, insurance, and finance being most frequently besieged.

One of the areas of vulnerability is the exchange of data among organizations or individuals, as well as devices connected to cloud-based networks. Within all industries, many organizations have offered solutions and major progress has been achieved for exchanging image data securely, however, a solution for exchanging images in a secure, privacy, and confidentiality-preserving way, while also maintaining operational efficiency has remained an elusive challenge.

While several publications have addressed the need for a novel image exchange methodology that offers enhanced security and confidentiality, and a few publications have offered theoretical alternatives to the current image exchange systems deployed, none of the published works have suggested a system to address most of the major challenges encountered in imaging.

Although the foundational elements for a multi-layered security strategy in imaging networks have been developed, there are ongoing areas of opportunity to improve privacy, confidentiality and reduce vulnerability to cyber-attacks. These areas of opportunity revolve around cloud-environment security, server security, device security, device and user identity management, access control, data provenance, auditability, compliance, image security, data integrity, and enhancement of operational efficiency. Blockchain technologies have proven highly effective in addressing these types of vulnerabilities and pain points in several other types of data exchanges, however, to date, the exchange of images has proven to be a barrier due to the notable lack of inherent security in systems designed many years ago for image exchange such as DICOM (Digital Communication in Medicine), their size and the way in which metadata are intermingled with and often burned into the images themselves. The overall strength of blockchain is its emphasis on decentralization and allowing easy addition of information but not allowing editing or removal of data. As highlighted in an article published in the Journal of Digital Imaging by McBee et al. in 2020, blockchain technology's main capabilities of immutability, encryption, and distributed ledger transaction recording are not fully leveraged or utilized at all currently in imaging exchanges due to lack of general knowledge about image formats, ledger size constraints, performance, complexity, and privacy concerns. Another noteworthy publication by Zhao et al. in 2020 offers a cryptographic hash and asymmetric encryption within a public blockchain as theoretical solutions to address the need for blockchain approaches that could address the barriers related to transmission speed, storage, security authentication, authorization, and peer to peer sharing in PACS (Picture Archiving and Communication Systems.

Furthermore, additional challenges encountered are related to devices shared by multiple users, manufactured and licensed by various vendors, and/or operating within a multitude of networks or systems of networks, a multitude of operating systems, and a variety of cloud environments.

The healthcare industry is one of the sectors most affected by these barriers and challenges because the exchange of medical images is paramount for any healthcare organization and crucial for state-of-the-art medical care. Offering a practical, efficient, and easily scalable cloud-enabled and cloud-independent image exchange solution powered by a cyber-resilient permissions blockchain technology can effectively change the paradigm.

Gartner estimated that 14 billion devices will be connected to the internet by 2022 and pointed out that this global network is currently at a heightened risk of cyber-vulnerability. The World Health Organization estimates that there are at least 2 million different kinds of medical devices on the world market and that they belong to approximately 700 generic device groups. The global medical device market is expected to reach $671 billion by 2027 and is expected to grow at a CAGR of 5.4% which indicates increased numbers of organizations and increasing exchange of data are likely to occur as part of routine business operations. Ransomware attacks increasingly involve medical information systems and specific medical devices and can cause loss of access, loss of functionality, or malicious alteration in functionality that put lives at risk in addition to causing operational and financial losses.

Medical image sharing represents a vital functionality for the healthcare industry globally and is critical for optimizing care coordination, and global public health. The global medical image sharing market is addressed by a wide variety of different hardware and software including Picture Archiving and Communication Systems (PACS), vendor-neutral archives (VNA), application-independent clinical archives, enterprise image exchanges, Health Image Exchanges, patient-centered archives such as hospital and medical network portals, and enterprise/universal viewers. Each one of these categories is vulnerable to cyber-attacks and could benefit from enhanced security, privacy, and integrity-preserving methods that do not disrupt operational efficiencies and maintain or even improve ROI.

In July 2021 the HHS Cybersecurity Coordination Center warned health systems PACS security vulnerabilities and has pointed out that the "DICOM standard is open to exploitation when connected to the Internet". These vulnerabilities inherent to DICOM, a standard that was originally designed to facilitate image exchange among an archive and imaging modalities such as CT more than 30 years ago, only accentuate the need for a secure, privacy, and integrity preserving solution for exchange of images for radiology and nuclear medicine, cardiology, pathology, endoscopy, dermatology, and many other types of medical images. The present description is intended to teach the systems and methods for a Multi-System, Multi-Client, Multi-Directional, Cyber-Resilient, Permissioned Blockchain Imaging Data Exchange Platform. However, there are other industries where image exchanges must be kept confidential, secure and operational efficiency is essential. Examples include: defense, energy, finance, space industry, etc.

SUMMARY

The summary of the present disclosure is provided to introduce a selection of key concepts in a simplified format that are further addressed in the detailed description section below.

The approaches described in this section are approaches that could be pursued, but not necessarily approaches that have been previously conceived or pursued. Therefore, unless otherwise indicated, one should not assume that any of the approaches described in this section qualify as prior art merely by virtue of being included in this section.

The present invention addresses the need for an innovative, practical solution for managing secure exchange of images, for instance where a variety of different clients, a variety of devices, a variety of devices originating from different vendors, or clients and devices belonging to different systems of networks or networks, perhaps even using different operating systems, using different servers, using different cloud environments, using different fabric networks, and/or using different information management systems, need to have the ability to exchange a variety of confidential imaging data in a privacy and integrity preserving way while maintaining operational speed and efficiency.

The present invention addresses the need for an imaging data exchange platform that can perform the full spectrum of needed services in a trusted network, such as e-consenting, continuous user identification, fine-grained user access control to apply a greater complexity of conditions for maintaining or revoking access to certain subsets of image and image related data, client certificates and policies for certificate verification, as well as provide robust access control for various client, device or image format types.

The present invention addresses the need for an image-exchange platform that, in some embodiments, provides data provenance and record all transactions in an immutable way to enhance auditability and compliance for heavily regulated industries where highly protected imaging data must be shared.

The present invention addresses the need for an image-exchange platform that are, in some embodiments, an industry-agnostic, server-agnostic, cloud environment-agnostic, device-agnostic, facility and healthcare network agnostic, cloud-enabled and cloud-independent.

The present invention addresses the need for an image-exchange platform that are, in some embodiments, an easily scalable and interoperable with any technology infrastructure or information technology management system.

The present invention addresses the need for an image exchange platform that, in some embodiments, utilizes blockchain approaches to provide secure remote imaging access.

The present invention addresses the need for an image exchange platform that, in some embodiments, uses blockchain as a distributed data store or index to establish a ledger of image access and authorized access permissions.

The present invention addresses the need for an image exchange platform that, in some embodiments, provides automated permission and mapping for zero trust identity protection during image exchange operations.

The present invention addresses the need for an image exchange platform that, in some embodiments, include decentralized access control for zero-trust network identity protection during image exchange operations by offering publish/subscribe functionality.

The present invention addresses the need for an image exchange platform that, in some embodiments, provides fine-grained access control for zero-trust access control for image exchange operations.

The present invention addresses the need for an image exchange platform that, in some embodiments, enables owners of images to securely delegate electronic access to other parties.

The present invention addresses the need for an image exchange platform that, in some embodiments, enables encryption algorithms to store images at rest and during transit using a cloud-based resource.

The present invention addresses the need for an image exchange platform that, in some embodiments, provides the ability to secure digital imaging identities at scale using a combination of a cryptographic hash of image content and digital signature of its owners.

The present invention addresses the need for an image exchange platform that, in some embodiments, allows images to be uploaded and stored in a cloud-based storage resource.

The present invention addresses the need for an image exchange platform that, in some embodiments, provided dynamic security for cloud-based image exchanges.

The present invention addresses the need for an image exchange platform that, in some embodiments, enables authorized access parties to download encrypted images and decrypt images to enhance secure exchanges.

The present invention addresses the need for an image exchange platform that, in some embodiments, provides immutability of image metadata exchange operations using a tamper-proof blockchain system. Multiple separate parties converge to a single immutable record of images using a decentralized consensus mechanism without requiring central authorization.

The present invention addresses the need for an image exchange platform that, in some embodiments, enhances operational efficiency during image exchange operations by deploying full private chaincode and smart contracting functionalities.

The present invention addresses the need for an image exchange platform that, in some embodiments, provides integrity and confidentiality by the deployment of a permissioned blockchain technology that uses threshold cryptographic primitives and enhanced security using Byzantine fault-tolerant (BFT) protocols, combined with a novel application of private chaincode functionality for image exchange operations.

The invention described in the present disclosure is configured for the use of confidentiality and integrity-protected chaincodes that define the application. Within the platform described, the confidentiality and integrity of image exchange operations and their related data are executed on a CPU in a trusted execution environment using contexts called enclaves. These enclaves executed on a CPU are secure and protected because they isolate data and programs from the host operating system and hypervisor (computer software or hardware that runs a virtual machine) in hardware, even if the entire platform is compromised. Within the platform described in the present disclosure, images are not stored on-chain, and chain codes encrypt all other necessary image-related data (metadata) stored on the ledger. Within the platform described the cryptography hash of images as image identities and their owner's digital signature are stored on the ledger. Within the platform described in the present disclosure, protected chaincode executed in enclaves are programmed and verified to process and/or release data according to specific and fully customizable requirements or rules that may be required in any industry that utilizes the images.

The present disclosure is differentiated from all other image-exchange platforms that require the upload, download, and exchange of the actual images, which can, in some embodiments, increase the cyber risk and reduce privacy, as well as decrease operational efficiency. The proposed solution can utilize chaincode (such as Hyperledger) as one of the components specifically targeting operational efficiency between different parties. Different systems and users can efficiently and collaboratively share the image hash code in one ledger to improve the efficiency of image sharing without sacrificing performance. Moreover, our proposed solution does not require any authentications or a cryptographic library to maintain a trusted channel between any of the organizations before exchanges can occur since each member engaged in the exchange has been authorized before joining.

The present disclosure, in some embodiments, offer a novel practical solution for image exchanges that provides all the above features and functionalities for any type of confidential, secure image exchange workflows that may be performed within a multi-system, multi-client, multi-directional network or system of networks that can accommodate a multitude of user workflows within each industry.

The foregoing and other objects are intended to be illustrative of the invention and are not meant in a limiting sense. Many possible embodiments of the invention can, in some embodiments, be made and will be readily evident upon a study of the following specification and accompanying drawings comprising a part thereof. Various features and subcombinations of invention can, in some embodiments, be employed without reference to other features and subcombinations. Other objects and advantages of this invention will become apparent from the following description taken in connection with the accompanying drawings, wherein is set forth by way of illustration and example, an embodiment of this invention and various features thereof.

A preferred embodiment of the invention, illustrative of the best mode in which the applicant has contemplated applying the principles, is set forth in the following description and is shown in the drawings and is particularly and distinctly pointed out and set forth in the appended claims.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 1 illustrates an environment representing an example of a Multi-System, Multi-Client, Multi-Directional, Cyber-Resilient, Permissioned Blockchain Imaging Exchange.

FIG. 2 illustrates the Permissioned Blockchain Network which may include but not be limited to at least one device, one owner client, one user, more than one server, a distributed ledger, a chaincode enclave, a hash, a chaincode, etc.

FIG. 3 illustrates an industry-agnostic workflow for at least one image exchange among at least one Fabric Private Chaincode (FPC) Client/User (originator) and other FPC client users (1, 2, 3, . . . , n), and at least one server, a fabric network, one ledger, one enclave, a cloud environment, at least one image, etc.

FIG. 4 illustrates a sample image exchange workflow for how at least one medical radiology image is exchanged between at least one patient, one physician, one next of kin, one IoT device and one hospital or imaging center. It shows an example of how the invention ensures the secure and confidential exchange of images between several users within the healthcare ecosystem, belonging to a variety of health systems, and using a variety of networks and devices.

FIG. 5 illustrates a wide variety of satellite operations applications that benefit from our invention that brings zero trust cybersecurity enabled by our proposed solution for satellite sensing. These applications represent single and systems of satellite capabilities that are used to assess a wide variety of phenomena that can be represented in an image format. Satellites and satellite systems produce an image file, such as GeoTiff, EOSAT, CEOS, LGSOWG, and HDF, that can be used to support decision making regarding strategic issues such as land management or tactical issues related to disaster response. With our solution, these satellite operations benefit from improved security that enforces security information sharing policies and creates a cryptographic certification of satellite operations, resource allocation and access for audit compliance.

FIG. 6 illustrates a sample workflow representing a financial industry example of deploying a Multi-System, Multi-Client, Multi-Directional, Cyber-Resilient, Permissioned Blockchain Imaging Data Exchange Platform with an exchange of financial images between at least one customer/user, merchant, one bank, one payment processor, one cloud network, one server, one device FIG. 7 illustrates a defense and security industry example. A wide variety of defense and civilian security applications benefit from our invention that brings zero trust cybersecurity enabled by our proposed solution for security screening. These applications represent geophysically distributed (within a facility or across facility locations) security capabilities that are used to assess risks associated with individuals, groups, packages, luggage, cargo, shipments, conveyances, vehicles, and a wide variety of transportation containers. Review and assessment of these items can involve human inspection and/or automation that involves photographic, video, Xray, CAT scan, MRI scan, microscopy, spectroscopy, and a wide array of active and/or passive current and future screening technologies. These systems produce an image file that can be used to support immediate, temporal and/or forensic risk assessment decision making at check points, points of entry, and entry/transfer/exit from logistics systems for people and goods. With our solution, these operations benefit from improved security that enforces security information sharing policies and creates a cryptographic certification of image-based screening operations, decision making and access for audit compliance.

FIG. 8 illustrates an energy image exchange example. Accuracy and validity of Renewable Energy Certificates (RECs) are crucial as we strive for net-zero status because they ensure that the claims made about the generation of renewable energy are correct and can be trusted. Mismanagement of RECs leads to false claims of amounts of renewable energy generation or the identity of those generating them, undermining credibility of the renewable energy market. Our solution can optimize security and confidentiality of images and metadata exchanged during the process through authentication of all users, devices, and characteristics of these RECs such as renewable full type, project capacity, the utility to which the project is connected, emissions rate, and unique certificate ID generated and secure the actual certificate at rest and in transit. The solution could also play an integral role by protecting images of authorized personnel to ensure the right persons/entities have appropriate level of access for the right resources.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The following detailed description includes references to the accompanying drawings, which form a part of the detailed description. The drawings show illustrations in accordance with the exemplary embodiments. These exemplary embodiments, which are also referred to herein as "examples" are described in enough detail to enable those skilled in the art to practice the present subject matter. The embodiments can be combined and other embodiments can be utilized, or structural, logical, and technical changes can be made without departing from the scope of what is claimed. Features of the embodiments described in one example may be combined with features described in a different example. The following detailed description is, therefore, not to be taken in a limiting sense, and the scope is defined by the appended claims and their equivalents. With the following description, for the purposes of explanation, numerous specific details are set forth to provide a thorough understanding. One or more examples may be practiced without these specific details. In some examples, well-known structures and devices are described with reference to the drawings to avoid unnecessarily obscuring features and characteristics of the presently described examples. This specification may include, and the claims may recite, some examples beyond those that are described in this introductory paragraph.

The examples described herein are differentiated from all previously existing technology. Such as but not limited to the ability to share images peer to peer without the need for a formal facility business agreement, the ability of a user to determine specifically whom he/she can share images with, ability to create an audit trail accessible by the patient or anyone the patient chooses have access to it, the ability to provide more rapid sharing in emergencies, etc.

Examples described herein include a technology platform that includes these primary components: user/client, IoT device, server, network, cloud computing platform, blockchain network, chaincode, node, hash, distributed ledger, secure private channel, smart contract, artificial intelligence algorithm, consensus algorithm, programming language, application programming interface, user interface, image acquisition device imaging modalities, raw (unprocessed) image exchange such as a CT sinogram or K-space MRI data. Image exchanges include accessing, sending, and receiving functionality, and the image exchanges include, in some embodiments, a processor, an image acquisition device, image viewing devices, a specific communication protocol, an IP address, a cloud-based access system, specialized software, storage devices, images of any type and format, including formats for a variety of medical modalities such as radiology, nuclear medicine, cardiology, pathology, dermatology, ophthalmology, surgery, GI medicine, and others in formats such as DICOM, JPG, PNG and compressed data formats such as cosine transform and wavelets.

Examples in some embodiments include commercial and industry-relevant devices for life sciences, healthcare, cybersecurity, insurance, energy, space, financial services, defense, supply chain, food safety, etc.

Examples in some embodiments include other technology infrastructure used for image exchanges such as screens, processors, picture archival systems, vendor neutral archives, picture communication systems, data storage systems, digital imaging systems, digital communication system, algorithms, film or paper digitization, analytics platforms, local area network (LAN), wide area network (WAN), Ethernet network, Token Ring network, asynchronous transfer mode (ATM) network, Wi-Fi network, Bluetooth, the Internet, cellular telephone network, Enhanced Data rates for GSM Evolution (EDGE) network, long-term evolution (LTE) network, 5G, 6G, infrared, satellite network, or other computing communications networks.

Examples in some embodiments include a network of nodes. The nodes can be local to and/or remote from each other.

Examples in some embodiments include one or more programming languages such as Python, SQL, NoSQL, C#, Rust, Perl, Go, JavaScript, HTML, CSS, Java, etc.

Examples in some embodiments include one or more cloud computing environments (IBM, Microsoft, Amazon, Ambra, GE, Dell, Siemens, Philips, Canon.)

Examples in some embodiments include a variety of standards used in industries performing confidential image exchanges such as HL7, FHIR, DICOM, CCD, DFARS, FISMA, ISO, HIPAA, GeoTiff, EOSAT, CEOS, LGSOWG, and HDF, etc.

Examples in some embodiments include a variety of APIs, API architecture types, and protocols Examples in some embodiments include devices that are mobile applications, stationary or portable devices, stationary of portable microcomputers, web-based applications, etc.

Techniques, methods, processes, and systems described herein enhance privacy, security, the confidentiality of image exchanges among multiple devices, multiple clients, multiple servers, multiple environments, multiple information technology systems, multiple networks, or systems of networks.

Examples in some embodiments include various blockchain technologies or blockchain frameworks used in a variety of industries such as Hyperledger, Ethereum, R3

Corda, Ripple, Quorum, Hyperledger Sawtooth, Hyperledger Fabric, IBM Blockchain, etc.

Examples in some embodiments include a network or system of networks. A network can be physical or an overlay network. Networks use various resources, such as include a processor, data storage, a virtual machine, a container, and/or a software application. Network resources are shared among multiple clients which can request services from the network concomitantly and independently of each other. In some embodiments, networks are cloud-based and would include a variety of service models.

Examples in some embodiments include a variety of cloud-based networks such as public, private, or hybrid cloud networks.

Examples in some embodiments include a variety of operating systems, such as Microsoft Windows, Apple macOS, Ubuntu, Android, Apple iOS, etc, Fedora, Solaris, Free BSD, Chrome OS, CentOS, Debian, Deepin, etc.

Techniques, methods, processes, and systems described herein enhance operational efficiency by increasing operational processing speed and reducing operational processing time.

The platform described in the present disclosure demonstrates an innovative multi-system, multi-client, multi-directional imaging data exchange that offers a transparent, decentralized trust network or system of networks for any protected imaging data exchanges. The trust network or system of networks offers optimal privacy, confidentiality, and security, as well as advanced identity management via e-consenting, and fine-grained access control. The platform enables compliance and auditability via immutability, and data provenance. The platform is configured to be industry agnostic, network agnostic, system-agnostic, server-agnostic, device-agnostic, image type-agnostic, workflow-agnostic, device-agnostic, and to be cloud-independent, and cloud-enabled. The trust network or system of networks may be highly interoperable with multiple fabric blockchain networks, easily scalable, and may optimize security via integrity-protected private chaincode functionality.

In some embodiments, the platform described in the present disclosure creates a trusted, decentralized, and immutable e-consenting system for all clients utilizing the image exchange platform.

The platform described in the present disclosure can, in some embodiments, allow for self-sovereignty of image sharing for all clients utilizing the image exchange platform.

The platform described in the present disclosure can, in some embodiments, optimize digital identity management for all image exchange workflows.

The platform described in the present disclosure can, in some embodiments, enhance network access management by deploying fine-grained access control and pub/sub capabilities for all image exchange operations and workflows.

The platform described in the present disclosure can, in some embodiments, enhance privacy.

The platform described in the present disclosure can, in some embodiments, enhance confidentiality.

The platform described in the present disclosure can, in some embodiments, enhance auditability The platform described in the present disclosure can, in some embodiments, enhance security.

The platform described in the present disclosure can, in some embodiments, enable compliance.

The platform described in the present disclosure can, in some embodiments, maximize data integrity.

The platform described in the present disclosure can, in some embodiments, maximize data provenance.

The platform uses asynchronous binary agreement (ABA) and adaptive threshold signature for data provenance. All the transactions need to be proved and signed before commit to the immutable ledger.

The platform described in the present disclosure can, in some embodiments, optimize the operational efficiency of image exchanges by allowing off chain storage of the actual image and by only storing all other related data onchain.

The platform described in the present disclosure can, in some embodiments, optimize speed of image exchanges by utilizing smart contract functionality.

The platform described in the present disclosure can, in some embodiments, utilize fabric private chaincode (FPC) functionality.

The platform described in the present disclosure is configured to not store any of the actual images onchain.

The platform described in the present disclosure is configured to store all other image-related data, cryptography hash of image, and owner's digital signatures onchain.

The platform described in the present disclosure is configured for the use of confidentiality and integrity protected chaincodes.

Within the platform described in the present disclosure chaincodes are executed in an enclave and execution is protected from the operating system and the hypervisor.

Within the platform described in the present disclosure chaincodes encrypt data stored on the ledger.

Within the platform described in the present disclosure the FPC chaincode establishes a secure channel.

Within the platform described in the present disclosure enclaves protect data even with the fabric blockchain network.

Within the platform described in the present disclosure enclaves are programmed and verified to process and release data according to specific and fully customizable requirements or rules.

The platform described in the present disclosure creates cryptographic encryption for key and value pairs.

The platform described in the present disclosure described in the present disclosure is configured for optional AI-enablement The platform described in the present disclosure can, in some embodiments, allow a variety of multi-system and multi-client image exchange workflows.

The platform described in the present disclosure can, in some embodiments, allow multi-directional image exchange workflows.

The platform described in the present disclosure can, in some embodiments, allow a variety of operations and functions to occur concomitantly.

The platform described in the present disclosure can, in some embodiments, allow image exchanges among a multitude of clients, devices, servers, environments, and networks or systems of networks.

The image exchange platform described in the present disclosure is cloud-enabled and cloud independent.

The image exchange platform described in the present disclosure is environment and device agnostic.

The image exchange platform described in the present disclosure can, in some embodiments, function as an overlay with other information technology systems.

The image exchange platform described in the present disclosure can, in some embodiments, be interoperable with any of the blockchain frameworks.

The image exchange platform described in the present disclosure is configured to be image type-agnostic (DICOM, APNG, AVIF, JPEG, GIF, RAW, TIFF, BMP, PSD, SVG, PDF, EPS, AI, CDR, WebP, ICO, etc.)

Fabric private Chain Code (FPC) enables the execution of chaincodes inside a trusted execution environment (TEE) and a trusted ledger enclave to provide confidentiality and integrity for the image exchange platform. Since chaincode is vulnerable to be attacked, the image metadata can be securely encrypted and hidden from any participants or even system administrator through TEE and trusted ledgers.

The image exchange platform does not store any of the actual images onchain.

The image exchange platform is storing all other image-related protected metadata onchain.

The fabric private chaincode (FPC) executes chaincodes in an enclave. Fabric Private Chaincode (FPC) enables the execution of chaincodes inside a trusted execution environment (TEE) and a trusted ledger enclave, for example particularly using Intel Software Guard Extensions (SGX) to protect the privacy and security of chaincodes and computation from potentially untrusted peer nodes, members or organizations.

Enclaves protect client data even within the fabric network. The enclave is a separated and encrypted region for codes and data in, for example, an intel CPU. The enclave can only be decrypted inside the processor, so it is even safe from direct reads from the RAM. It protects the data even within the fabric network. Enclaves isolate data and programs from the host operating system in hardware, meaning that all the chaincodes executing on the operating system are isolated from other applications, processors, threads, and operating systems as well as hypervisor which controls multiple operating systems to operate concurrently on a single hardware platform.

FPC chaincodes encrypt data stored on the ledger. FPC chaincodes encrypt data stored on the ledger, and allow a programmer to write chaincode applications where the data is encrypted on the ledger and can only be accessed by authorized parties.

Client FPC chaincode establishes a secure channel. FPC establishes a secure SGX-based enclave for executing private chaincode and all the released FPC client data will be encrypted stored in a ledger in a channel shared with different organizations.

A Fabric channel is a private subnet of communication between two or more specific network members or organizations, for the purpose of conducting private and confidential transactions.

Enclaves are programmed and verified to process and release data according to specific requirements (regulatory, business rules, clinical rules, other custom criteria).

The chaincodes execution in an enclave is a separated and encrypted region for code and data. Chaincodes can be programmed and verified to process and release data according to specific requirements (regulatory, business rules, clinical rules, other custom criteria).

Techniques, methods, processes, and systems described herein can enhance operational efficiency by increasing operational processing speed and reducing operational processing time.

Various embodiments of the computer program, system, and method of embodiments of the present invention are implemented in hardware, software, firmware, or combinations thereof, which broadly comprises server devices, computing devices, and a communications network. Various embodiments of the server devices include computing devices that provide access to one or more general computing resources, such as Internet services, electronic mail services, data transfer services, and the like. In some embodiments the server devices also provides access to a database that stores information and data, with such information and data including, without limitation, account information, NLU model information, campaign information, personality information, or other information and data necessary and/or desirable for the implementation of the computer program, system, and method of the present invention, as will be discussed in more detail below.

Various embodiments of the server devices and the computing devices include any device, component, or equipment with a processing element and associated memory elements. In some embodiments the processing element implements operating systems, and in some such embodiments is capable of executing the computer program, which is also generally known as instructions, commands, software code, executables, applications (apps), and the like. In some embodiments the processing element includes processors, microprocessors, microcontrollers, field programmable gate arrays, and the like, or combinations thereof. In some embodiments the memory elements are capable of storing or retaining the computer program and in some such embodiments also store data, typically binary data, including text, databases, graphics, audio, video, combinations thereof, and the like. In some embodiments the memory elements also are known as a "computer-readable storage medium" and in some such embodiments include random access memory (RAM), read only memory (ROM), flash drive memory, floppy disks, hard disk drives, optical storage media such as compact discs (CDs or CDROMs), digital video disc (DVD), Blu-Ray™, and the like, or combinations thereof. In addition to these memory elements, in some embodiments the server devices further include file stores comprising a plurality of hard disk drives, network attached storage, or a separate storage network.

Various embodiments of the computing devices specifically include mobile communication devices (including wireless devices), work stations, desktop computers, laptop computers, palmtop computers, tablet computers, portable digital assistants (PDA), smart phones, wearable devices and the like, or combinations thereof. Various embodiments of the computing devices also include voice communication devices, such as cell phones or landline phones. In some preferred embodiments, the computing device has an electronic display, such as a cathode ray tube, liquid crystal display, plasma, or touch screen that is operable to display visual graphics, images, text, and the like. In certain embodiments, the computer program of the present invention facilitates interaction and communication through a graphical user interface (GUI) that is displayed via the electronic display. The GUI enables the user to interact with the electronic display by touching or pointing at display areas to provide information to the user control interface, which is discussed in more detail below. In additional preferred embodiments, the computing device includes an optical device such as a digital camera, video camera, optical scanner, or the like, such that the computing device can capture, store, and transmit digital images and/or videos.

In some embodiments the computing devices includes a user control interface that enables one or more users to share information and commands with the computing devices or server devices. In some embodiments, the user interface facilitates interaction through the GUI described above or, in other embodiments comprises one or more functionable inputs such as buttons, keyboard, switches, scrolls wheels, voice recognition elements such as a microphone, pointing devices such as mice, touchpads, tracking balls, styluses.

Embodiments of the user control interface also include a speaker for providing audible instructions and feedback. Further, embodiments of the user control interface comprise wired or wireless data transfer elements, such as a communication component, removable memory, data transceivers, and/or transmitters, to enable the user and/or other computing devices to remotely interface with the computing device.

In various embodiments the communications network will be wired, wireless, and/or a combination thereof, and in various embodiments will include servers, routers, switches, wireless receivers and transmitters, and the like, as well as electrically conductive cables or optical cables. In various embodiments the communications network will also include local, metro, or wide area networks, as well as the Internet, or other cloud networks. Furthermore, some embodiments of the communications network include cellular or mobile phone networks, as well as landline phone networks, public switched telephone networks, fiber optic networks, or the like.

Various embodiments of both the server devices and the computing devices are connected to the communications network. In some embodiments server devices communicate with other server devices or computing devices through the communications network. Likewise, in some embodiments, the computing devices communicate with other computing devices or server devices through the communications network. In various embodiments, the connection to the communications network will be wired, wireless, and/or a combination thereof. Thus, the server devices and the computing devices will include the appropriate components to establish a wired or a wireless connection.

Various embodiments of the computer program of the present invention run on computing devices. In other embodiments the computer program runs on one or more server devices. Additionally, in some embodiments a first portion of the program, code, or instructions execute on a first server device or a first computing device, while a second portion of the program, code, or instructions execute on a second server device or a second computing device. In some embodiments, other portions of the program, code, or instructions execute on other server devices as well. For example, in some embodiments information is stored on a memory element associated with the server device, such that the information is remotely accessible to users of the computer program via one or more computing devices. Alternatively, in other embodiments the information is directly stored on the memory element associated with the one or more computing devices of the user. In additional embodiments of the present invention, a portion of the information is stored on the server device, while another portion is stored on the one or more computing devices. It will be appreciated that in some embodiments the various actions and calculations described herein as being performed by or using the computer program will actually be performed by one or more computers, processors, or other computational devices, such as the computing devices and/or server devices, independently or cooperatively executing portions of the computer program.

A user is capable of accessing various embodiments of the present invention via an electronic resource, such as an application, a mobile "app," or a website. In certain embodiments, portions of the computer program are embodied in a stand-alone program downloadable to a user's computing device or in a web-accessible program that is accessible by the user's computing device via the network. For some embodiments of the stand-alone program, a downloadable version of the computer program is stored, at least in part, on the server device. A user downloads at least a portion of the computer program onto the computing device via the network. After the computer program has been downloaded, the program is installed on the computing device in an executable format. For some embodiments of the web-accessible computer program, the user will simply access the computer program via the network (e.g., the Internet) with the computing device.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations can, in some embodiments, be made in embodying the above invention, and in the construction thereof, other than those specifically set forth herein, can, in some embodiments, be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A non-transitory permissioned blockchain technology system, including:
   (1) enhanced privacy, confidentiality, and security of image exchanges with off-chain image storage while all other image-related metadata are cryptography hashed and the owner's digital signature is stored onchain;
   wherein the enhanced privacy, confidentiality, and security of the image exchanges are due to
   (a) execution of integrity-protected private chain codes in an enclave, isolated from an operating system and hypervisor;
   (b) secure channels and protection even during transit within each blockchain network;
   (c) advanced identity management and fine-grained access control which allows greater complexity and control of image access;

(d) decentralized access control for zero-trust network identity protection during image exchange operations by offering publication and subscription functionality; and (e) a permissioned blockchain that uses threshold cryptographic primitives and a Byzantine fault-tolerant (BFT) protocol, combined novel private chain code functionality for image exchange operations;

(2) enhanced and secure auditability of image exchange operations within the permissioned blockchain technology platform (a) by recording all the image exchange operations on an immutable ledger, and (b) due to data provenance functionality;

(3) enhanced operational efficiency of the image exchange operations due to the private chain code functionality and secure off-chain image storage; and (4) a multi-trust without requiring complicated authentication processes for members already authorized within the permissioned blockchain.

2. A method comprising:

(1) enhancing privacy, confidentially, and security of image exchanges with off-chain image storage while all other image-related metadata are cryptography hashed and the owner's digital signature is stored on chain;

wherein the enhanced privacy, confidentiality, and security of the image exchanges are due to preforming the steps of:

(a) executing integrity-protected private chain codes in an enclave, isolated from an operating system and hypervisor;

(b) securing channels and protection even during transit within each blockchain network;

(c) performing identity management and fine-grained access control which allows greater complexity and control of image access;

(d) providing decentralized access control for zero-trust network identity protection during image exchange operations by offering publication and subscription functionality; and (e) utilizing a permissioned blockchain that uses threshold cryptographic primitives and a Byzantine fault-tolerant (BFT) protocol, combined novel private chain code functionality for image exchange operations;

(2) enhancing and securing auditability of image exchange operations within the permissioned blockchain technology platform (a) by recording all the image exchange operations on an immutable ledger, and (b) due to data provenance functionality;

(3) enhancing operational efficiency of the image exchange operations due to the private chain code functionality and secure off-chain image storage; and (4) providing a multi-trust without requiring complicated authentication processes for members already authorized within the permissioned blockchain.

* * * * *